United States Patent
Brach

(10) Patent No.: US 7,444,914 B2
(45) Date of Patent: Nov. 4, 2008

(54) SAW BLADE WITH MULTIPLE BORE SIZES

(75) Inventor: Kurt Brach, Rodgau (DE)

(73) Assignee: Saint-Gobain Abrasives Technology Company, Worchester, MA (US)

( * ) Notice: Subject to any disclaimer, the term of this patent is extended or adjusted under 35 U.S.C. 154(b) by 475 days.

(21) Appl. No.: 11/137,665

(22) Filed: May 25, 2005

(65) Prior Publication Data

US 2006/0266176 A1    Nov. 30, 2006

(51) Int. Cl.
    B23D 61/02    (2006.01)
(52) U.S. Cl. ............................... 83/665; 83/835
(58) Field of Classification Search .............. 83/665, 83/666, 835; 451/342
    See application file for complete search history.

(56) References Cited

U.S. PATENT DOCUMENTS

| | | | |
|---|---|---|---|
| 2,497,217 A | 2/1950 | Hall | |
| 2,512,970 A * | 6/1950 | Rogne | 83/666 |
| 2,600,459 A * | 6/1952 | Adams | 83/665 |
| 2,822,648 A * | 2/1958 | Metzger et al. | 451/342 |
| 2,854,042 A * | 9/1958 | Robinson | 83/666 |
| 3,198,227 A | 8/1965 | Roberts | |
| 3,353,306 A * | 11/1967 | Seymour et al. | 451/342 |
| 3,647,310 A | 3/1972 | Morse | |
| 3,792,856 A | 2/1974 | Hernandez | |
| 4,240,230 A | 12/1980 | Ferrantini | |
| 4,706,386 A | 11/1987 | Wiley | |
| 4,730,952 A * | 3/1988 | Wiley | 403/316 |
| 5,303,688 A | 4/1994 | Chiuminatta et al. | |
| 5,373,834 A | 12/1994 | Chiuminatta et al. | |
| 5,477,845 A | 12/1995 | Zuzelo | |
| 5,603,310 A | 2/1997 | Chiuminatta et al. | |
| 5,694,693 A | 12/1997 | Hutchins et al. | |
| 6,067,888 A * | 5/2000 | Achterberg et al. | 83/835 |
| 6,230,600 B1 | 5/2001 | Stroud | |
| 6,340,022 B1 | 1/2002 | Schroer | |
| 6,651,644 B1 | 11/2003 | Zuzelo | |
| 6,796,210 B2 * | 9/2004 | Baron | 83/676 |
| 6,817,936 B1 | 11/2004 | Skeem et al. | |
| 2004/0149114 A1 | 8/2004 | Brach | |

FOREIGN PATENT DOCUMENTS

| | | |
|---|---|---|
| AU | 755 889 B2 | 1/2003 |
| DE | 296 10 994 U1 | 9/1996 |
| DE | AT 006 785 U2 | 4/2004 |
| DE | 20 2004 010 631 U1 | 1/2005 |

* cited by examiner

*Primary Examiner*—Kenneth E. Peterson
(74) *Attorney, Agent, or Firm*—Mike W. Crosby

(57) ABSTRACT

A circular saw blade is provided with a first bore of a first size, configured for engagement with a first size arbor. The disk also has a second bore of a second size configured for engagement with a second size arbor. The second bore is disposed concentrically with the first bore, and is placed within a knockout portion of a disk secured to a face of the saw blade. The knockout portion is removable for enlarging an inner transverse dimension of the disk beyond that of the first bore. The second transverse dimension is within an ISO H7 standard tolerance. The disk is thus configured for mounting the second bore on the second size arbor, and alternatively for removing the knockout portion to mount the first bore on the first size arbor.

10 Claims, 1 Drawing Sheet

SAW BLADE WITH MULTIPLE BORE SIZES

BACKGROUND

RELATED APPLICATION

1. Technical Field

This invention relates to saw blade equipment, and more particularly to an assembly providing circular saw blades with multiple bores of ISO H7 standard tolerances for mounting on arbors of various sizes.

2. Background Information

Power saws of the type that utilize circular saw blades come in a variety of sizes, and are produced and sold by many manufacturers. Although these power tools tend to be similar in many respects, distinctions are also present, not the least of which is the size of the spindle on which the saw blades are mounted. As a result, a user must be careful to purchase a saw blade having a central bore that is properly sized for the particular make and model of power tool onto which the blade is to be installed. Oftentimes, however, the user inadvertently purchases a blade having a central bore size that does not fit the user's machine. Or, the user may simply wish to remove a blade from one tool and reinstall it on another tool, only to find that the spindle of the other tool doesn't fit the bore of the blade.

Attempts to mount saw blades onto relatively undersized spindles leave a gap between the bore and the spindle which disadvantageously enables the saw blade to move radially relative to the spindle. Such radial movement tends to generate eccentric rotation (e.g., 'running untrue') of the blade during operation, which may result in inaccurate cutting, damage to the saw blade, and potential danger to the user.

A potential solution to this problem includes the use of reduction rings placed between the bore and the spindle to effectively reduce the bore size and prevent the blade from running untrue during operation. The blade may be secured to the spindle in a conventional manner, e.g., by the use of opposed circular flanges disposed on the spindle, which are tightened towards one another to capture both the saw blade and the reduction ring(s) therebetween.

However, these opposed flanges are typically concavo-convex or dish shaped, to engage the blade radially outward of its bore. Thus, the reduction ring(s) may not be tightly engaged by the flanges. Unfortunately, this may permit the reduction ring(s) to move axially out of the bore during use. Once such axial movement has occurred, only the friction forces applied by the flanges serve to maintain the blade in concentric orientation with the spindle. In the event these forces are exceeded, the blade moves radially and becomes eccentric to the spindle.

Another solution that has been popular in the United States includes providing the steel centers of saw blades with concentric knock out rings. In this approach, the blade is-provided with a small bore size, and larger bore sizes are partially cut into the blade by methods such as laser cutting or wire EDM. Then if needed, a larger size bore can be obtained simply by knocking out the portion of the blade interior thereof, e.g., using a hammer or other suitable tool.

This approach, however, is generally not usable outside of the U.S. because of the relatively loose tolerances typically associated with bores formed upon removal of laser or EDM cut knockout rings. Such knockouts typically provide a bore tolerance within the ISO H9 standard, i.e., of ±0.04 mm. International standards, such as EN13236, used outside the United States, require a tighter bore tolerance of ISO H7 STANDARD, i.e., of ±0.02 mm.

Thus, a need exists for a device and method for securely attaching a saw blade to spindles of various sizes in a manner that complies with international standards.

SUMMARY

In one aspect of the invention, an apparatus is provided for enabling a circular saw blade to be selectively fastened to arbors of various sizes. The apparatus includes a disk configured for being secured in superposed alignment with a face of the saw blade, the saw blade having a first bore of a first transverse dimension configured for concentric engagement with a first size arbor, to substantially maintain concentricity of the first bore with the first size arbor during operational rotation about its central axis. The disk has a second bore of a second transverse dimension configured for concentric engagement with a second size arbor, to substantially maintain concentricity of the second bore with the second size arbor during operational rotation about its central axis. The second bore is configured for concentric disposition with the first bore, and is placed within a knockout portion of the disk. The knockout portion is removable for enlarging an inner transverse dimension of the disk beyond that of the first bore. The second transverse dimension is within an ISO H7 standard tolerance. The disk is thus configured for mounting the second bore on the second size arbor, and alternatively for removing the knockout portion to mount the first bore on the first size arbor.

Another aspect of the invention includes an apparatus for selectively fastening a circular saw blade to arbors of various sizes. The apparatus includes disk means for being secured in superposed alignment with a face of the saw blade, the saw blade having first bore means of a first size configured for concentric engagement with a first size arbor, to substantially maintain concentricity of the first bore with the first size arbor during operational rotation about its central axis. The disk means includes a second bore means of a second size configured for concentric engagement with a second size arbor, to substantially maintain concentricity of the second bore with the second size arbor during operational rotation about its central axis. The second bore means is configured for concentric disposition with the first bore means, and is disposed within a bore removal means portion of the disk means. The bore removal means is removable for enlarging an inner transverse dimension of the disk beyond that of the first bore means. The second transverse dimension is within an ISO H7 standard tolerance. The disk means is configured for selectively mounting the second bore on the second size arbor, and alternatively for removal of the bore removal means to mount the first bore on the first size arbor.

A further aspect of the invention includes a method of providing a circular saw blade apparatus for selective fastening to arbors of various sizes. The method includes providing a circular saw blade having a first bore of a first transverse dimension configured for concentric engagement with a first size arbor, to substantially maintain concentricity of the first bore with the first size arbor during operational rotation about its central axis. The method also includes providing a disk configured for being secured in superposed alignment with a face of the saw blade. The disk is provided with a second bore of a second transverse dimension configured for concentric engagement with a second size arbor, to substantially maintain concentricity of the second bore with the second size arbor during operational rotation about its central axis. The second bore is configured for concentric disposition with the first bore, and is disposed within a knockout portion of the disk. The knockout portion is configured for being removable for enlarging an inner transverse dimension of the disk beyond that of the first bore. The second transverse dimension is within an ISO H7 standard tolerance. The disk is configured for mounting the second bore on the second size arbor, and alternatively for removing the knockout portion to mount the first bore on the first size arbor. The method also includes securing the disk in superposed alignment with a face of the saw blade; and disposing the second bore of the disk concentrically with the first bore of the saw blade, so that the saw blade apparatus is configured for being mounted with the second bore on the second size arbor, or alternatively, for having the knockout portion removed and mounting the first bore on the first size arbor.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 2:
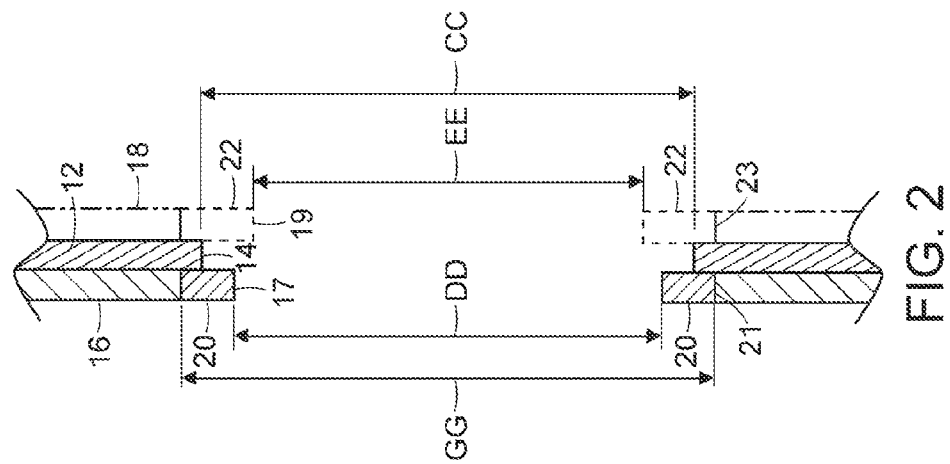
FIG. 2 is a cross sectional view, on an enlarged scale with optional portions shown in phantom, taken along 2-2 of FIG. 1.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Figure 1:
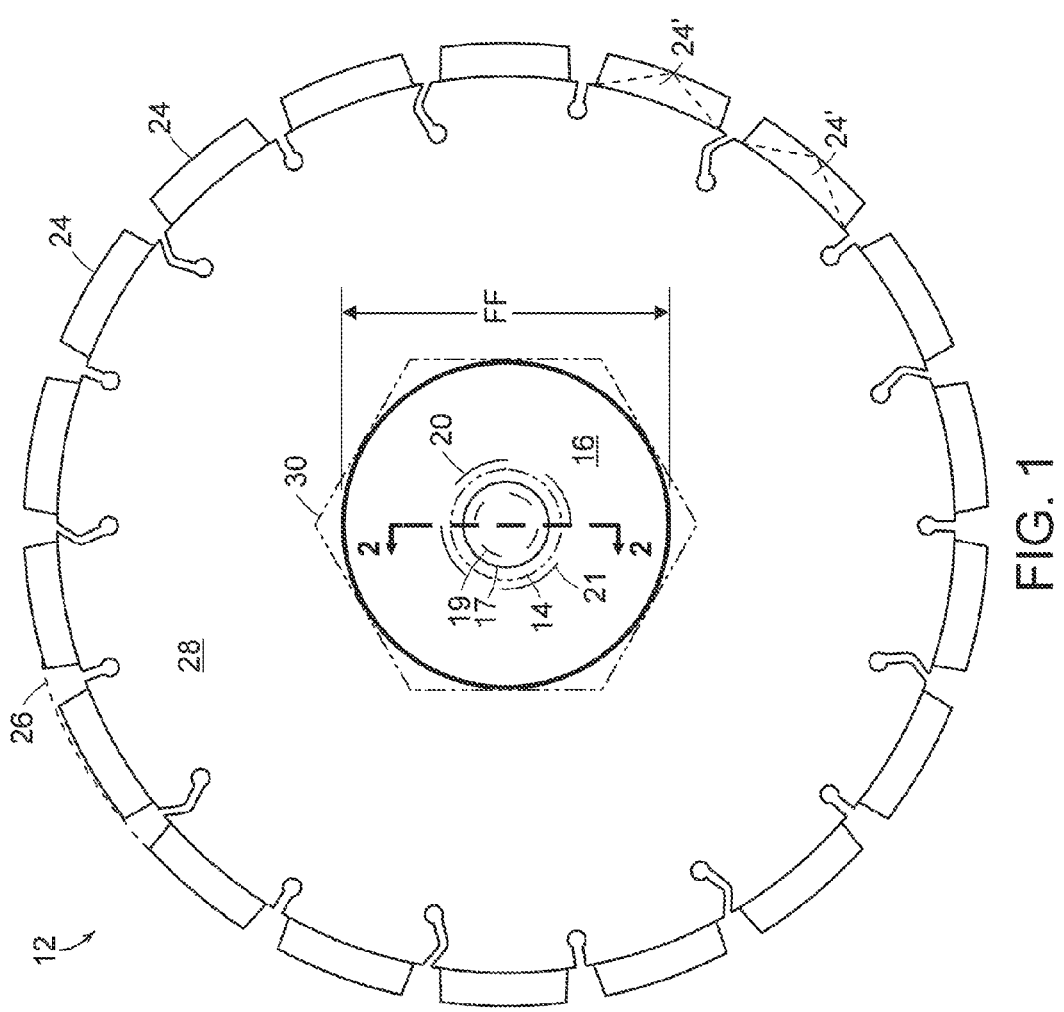
FIG. 1 is a schematic plan view, with optional and hidden portions shown in phantom, of a circular blade with which an embodiment of the present invention is installed.

Briefly, as best shown in FIGS. 1 and 2, an embodiment of the present invention includes a saw blade 12 disposed between a pair of disks 16, 18 fastened in superposed orientation to opposite faces thereof. The disks 16, 18 each have a central bore 17, 19, respectively, oriented concentrically with a central bore 14 of saw blade 12. As shown in FIG. 2, bores 17 and 19 have respective transverse dimensions (e.g., diameters) DD, EE, which are less than that (CC) of central bore 14. These dimensions DD, EE, and CC are predetermined to receivably engage arbors or spindles (e.g., of power saws) of three discrete sizes.

Bores 17 and 19 are respectively disposed within knockouts 20, 22, defined by conventional score lines or partial cuts 21, 23. These knockouts may be selectively removed by a user, such as to remove bore 17 and/or 19 to provide clearance for a larger arbor/spindle.

For example, blade 12 may be secured to a power saw having a relatively small diameter arbor, using bore 19. In the event blade 12 is to be installed to a power saw having a larger, medium sized arbor, knockout 22 may be removed, to provide clearance for engagement of the arbor with bore 17. Similarly, in the event blade 12 is to be engaged to a relatively large arbor, cutout 20 may also be removed to provide clearance for engagement of this large arbor with bore 14. (Thus, in this embodiment, bore 14 serves as a 'first' bore, while bore 17 serves as a 'second' bore, and bore 19 serves as an optional 'third' bore, as claimed.)

Advantageously, this embodiment enables a single saw blade to be safely fastened to arbors of three distinct sizes, in a tightly toleranced (e.g., ISO H7 standard) fashion. Such tight tolerances are enabled by pre-forming each bore, rather than forming them in the field upon removal of knockouts as described hereinabove. This aspect advantageously tends to reduce the number of saw blades that need to be kept in stock by retailers and users. In addition, the use of disks 16 and/or 18 has been found to advantageously provide a significant noise dampening effect during use. It is suspected that this noise dampening effect is due to the increased mechanical support provided to the blade by the disks 16, 18, and/or the change in resonance frequency relative to conventional single thickness saw blades.

The term "axial" when used in connection with an element described herein, refers to a direction relative to the element, which is substantially parallel to its center of rotation when the element is installed on an arbor. Similarly, the term "transverse" refers to a direction other than substantially parallel to the axial direction. The term "transverse cross-section" refers to a cross-section taken along a transverse plane.

Various embodiments of the invention will now be described in greater detail, with reference to FIGS. 1-2. Referring initially to FIG. 1, embodiments of the present invention may be used with substantially any type of circular saw blade known to those skilled in the art. For convenience, these embodiments are shown and described with a superabrasive (e.g., diamond) saw blade 12 having a plurality of cutters 24 spaced along its periphery. An example of such a saw blade is disclosed in U.S. Patent Publication No. US2004/0149114 to Saint-Gobain Abrasives, Inc., which is fully incorporated by reference herein.

These superabrasive tools are particularly useful in applications where other tools lack the strength and durability to be practical substitutes. For example, diamond saws are routinely used to cut concrete, asphalt, stone, and other hard materials.

In the embodiments shown, cutters 24 take the form of conventional superabrasive-laden segments spaced along the periphery thereof, including abrasive grain brazed or otherwise secured to the surface of core 28. For example, these superabrasive tools may be manufactured by mixing superabrasive particles such as diamond or cubic boron nitride (CBN) with a suitable metal matrix powder (bond). The mixture is then compressed in a mold to form the desired shape (e.g., segment 24). The "green" form is then consolidated by sintering at a suitable temperature to form a single body with a plurality of superabrasive particles disposed therein. The consolidated body or segment is attached (e.g., by brazing or laser welding) to a tool body, such as to the round core 28 of a circular saw, to form the final product.

Other exemplary superabrasive saw blades include a continuous superabrasive-laden rim 26 adhered to the perimeter of a circular steel core as shown in phantom. This abrasive rim 26 may be formed substantially as described above with respect to segments 24, or by simply brazing, electroplating or electroforming a layer of abrasive grain onto the outer perimeter of the tool body or core 28.

As discussed above, these superabrasive blades are intended for relatively difficult cutting operations, which tend to generate high stresses in the blades. As such, any eccentricity in their rotation during cutting would tend to increase these stresses, possibly to the point of dislodging the abrasive segments from the core, and/or increasing the difficulty of the cutting operation. Any eccentricity may thus be particular problematic when the blades are used in hand-held saws. Accordingly, embodiments of the present invention may be particularly useful with superabrasive saw blades used in hand held power saws.

As a further variation, saw blade 12 may be provided with cutters in the form of teeth 24', such as shown in phantom. Teeth 24' may be of nominally any size and shape commonly used on saw blades, e.g., to cut relatively soft materials such as wood, plastic, and the like. Teeth 24' may be provided with conventional hardened tips, such as fabricated from tungsten carbide, and/or may be provided with the abrasive grain described hereinabove. Example of saw blades having cutters in the form of teeth 24' are described in U.S. Pat. No. 6,817, 936 B1.

As shown, blade 12 includes a metallic core 28, having a central bore 14 for fastening the blade to the spindle/arbor of a circular saw (not shown) in a conventional manner, e.g., between a pair of opposed machine flanges. Core 28 is substantially circular in shape, and may comprise substantially any material having the requisite strength for the particular cutting application. Examples of suitable core materials are steel, aluminum, titanium, bronze, their composites and alloys, and combinations thereof. Reinforced plastics having sufficient specific strength may also be used to construct the core. Generally desirable metallic core materials include ANSI 4130 steel and aluminum alloys, 2024, 6065 and 7178.

Referring now to both FIGS. 1 and 2, one embodiment of the invention a blade 12 having only a single disk 16 fastened thereto. This disk may be fastened in any convenient manner, such as using spot welds, laser welds, braze, mechanical fasteners (e.g., bolts, screws, rivets, detents) and adhesives, etc.

As shown, disk 16 is provided with a central bore 17 disposed concentrically with bore 14 of the blade. Bore 17 is provided with predetermined transverse dimension (e.g., diameter) DD, which meets or exceeds ISO H7 standard tolerance standards for saw blade bores.

Bore 17 is disposed within knockout portion 20, defined by score lines or partial cuts 21. This arrangement enables the operative portion (including bore 17) of disk 16 to be easily removed, such as by striking the knockout portion with a hammer or other tool as described above. Score lines/cuts 21 are disposed radially outward of bore 14, e.g., at a transverse dimension GG greater than dimension CC of bore 14. This disposition is provided so that once knockout 20 is removed, sufficient clearance will be provided for an arbor to pass through and engage bore 14 without interfering with disk 16.

In the embodiment shown, disk 16 may be fabricated from steel, with an axial thickness substantially similar to that of blade 12, as best shown in FIG. 2. However, those skilled in the art should recognize that disk 16 may be fabricated from any number of materials, including various metals, polymers, and/or fiber reinforced composites, etc., having substantially any axial thickness, provided such materials have sufficient structural integrity to withstand the stresses of particular cutting operations. Particular embodiments of the present invention may thus be fabricated from metals such as aluminum, bronze, titanium, steel, and alloys and combinations thereof, using conventional fabrication techniques, such as machining, molding and/or forging operations.

In addition, although not required, in particular embodiments disk 16 may be provided with an outer dimension (e.g., diameter) FF greater than that of a conventional machine flange (not shown) used to secure a saw blade 12 to the arbor of a power saw. Such a configuration enables the flange to engage disk 16 and effectively compress it axially into engagement with the blade 12. Such compression tends to supplement the aforementioned fastening of disk 16 to blade 12.

In addition, although disk 16 is shown with a circular periphery, the skilled artisan should recognize that the disk may be provided with a periphery of substantially any shape, without departing from the spirit and scope of the present invention. For example, the disk 16 may optionally be provided with a polygonal periphery as shown in phantom at 30 in FIG. 1.

This embodiment enables blade 12 to be secured to a power saw having a relatively small diameter arbor, using bore 17. Alternatively, in the event blade 12 is to be installed to a power saw having a larger arbor, knockout 20 may be removed, to provide clearance for engagement of the arbor with bore 14. Thus, this embodiment advantageously enables blade 12 to be concentrically secured to arbors of two discrete sizes, at relatively tight (e.g., ISO H7 standard) tolerances. These tight tolerances are provided by using pre-formed bores, which may be conveniently held to tighter tolerances than bores formed in the field such upon removal of knockouts defined by score or cut lines as described hereinabove.

As best shown in FIG. 2, as also mentioned hereinabove, an optional embodiment of the invention includes a second disk 18, shown in phantom, fastened to blade 12 on a face opposite that of disk 16. In this alternate embodiment, disks 16 and 18 effectively sandwich blade 12 therebetween. Disk 18 is substantially similar to disk 16, while including a bore 19 having a transverse dimension EE distinct from (e.g., smaller than) dimension DD of disk 16. Bore 19 is disposed within knockout 22 defined by score lines/cuts 23, for optional removal in the manner described above with respect to knockout 20.

This alternate embodiment enables the saw blade to be concentrically secured to arbors of three discrete sizes, each within relatively tight (e.g., ISO H7 standard) tolerances. In particular, the blade may be secured to a relatively small diameter arbor using bore 19 of disk 18. Alternatively, in the event blade 12 is to be installed to a power saw having a larger arbor, knockout 22 may be removed, to provide clearance for engagement of the arbor with bore 17 of disk 16. Still further, knockout 20 may be removed to provide clearance for engagement of a still larger arbor with bore 14.

Although bores have been shown and described as being circular in transverse cross-section to receive similarly shaped arbors, those skilled in the art should recognize that the bores may be provided with substantially any cross-sectional geometry, e.g., triangular, rectangular, diamond, square, etc., such as may be required to accommodate shafts of similar cross-sectional geometry, without departing from the spirit and scope of the present invention.

Moreover, although embodiments having one and two disks fastened to a saw blade have been shown and described, it should be evident that additional disks, e.g., having bores of successively smaller transverse dimension, may be superposed with one another on saw blade 12 to further expand the range of spindle/arbor sizes to which blade 12 may be fastened.

The following illustrative example is intended to demonstrate certain aspects of the present invention. It is to be understood that this example should not be construed as limiting.

EXAMPLE

A saw blade 12 (NORTON™ PRO LINE, ZDH 500, 300 mm outside diameter, manufactured by Saint-Gobain Abrasives S.A., Bascharage, Luxembourg) was provided with disks 16 and 18 substantially as shown and described hereinabove with respect to FIGS. 1 and 2. Disks 16 and 18 were fabricated from steel, having outside diameters FF of 100 mm. Blade 12 had a central bore of 25.4 mm in diameter, while disks 16 and 18 had central bores 17 and 19 of 22.23 mm and 20 mm, respectively. Tolerances of the bore dimensions met or exceeded the ISO H7 standard. Bores 17 and 19 were respectively disposed in knockouts 20, 22 having outer diameters GG of 27.8 mm formed by providing laser cuts 21, 23, while leaving small webs sufficient to hold knockouts 20, 22 in place as shown.

Blade 12 was engaged with a power saw having an arbor of 19.99 mm diameter, using bore 19 and tested by cutting a masonry workpiece. Thereafter, knockout 22 was removed, and blade 12 engaged with a 22.22 mm diameter arbor using bore 17, following by test cutting a masonry workpiece. Knockout 20 was subsequently removed, and blade 12 fastened to a 25.39 mm arbor using bore 14, followed by test cutting of the masonry workpiece. In each of these test cuts, blade 12 was successfully maintained in concentric orientation with the arbors.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. An apparatus comprising:
   a saw blade; and
   a disk configured secured to a face of the saw blade, the saw blade having a first bore of a first transverse dimension configured for concentric engagement with a first size arbor, to substantially maintain concentricity of the first bore with the first size arbor during operational rotation about its central axis;
   the disk having a second bore of a second transverse dimension configured for concentric engagement with a second size arbor, to substantially maintain concentricity of the second bore with the second size arbor during operational rotation about its central axis;
   the second bore configured for concentric disposition with the first bore;
   the second bore being disposed within a knockout portion of said disk;
   said knockout portion being removable for enlarging an inner transverse dimension of said disk beyond that of the first bore;
   the first and second transverse dimensions being within an ISO H7 standard tolerance;
   wherein the disk is configured for mounting the second bore on the second size arbor, and alternatively for removing the knockout portion to mount the first bore on the first size arbor.

2. The apparatus of claim 1, wherein said disk has an outer transverse dimension greater than or equal to that of a clamping flange used to secure the blade to at least one of the first size arbor and second size arbor.

3. The apparatus of claim 1, comprising a plurality of said disks configured for superposed engagement with the saw blade, said plurality of disks having bores of mutually distinct transverse dimensions.

4. The apparatus of claim 1, comprising:
   a second disk configured for being secured in superposed alignment with said disk;
   the second disk having a third bore of a third transverse dimension configured for concentric engagement with a third size arbor, to substantially maintain concentricity of the third bore with the third size arbor during operational rotation about its central axis;
   the third bore configured for concentric disposition with the second bore;
   the third bore being disposed within a knockout portion of said second disk;
   said knockout portion of said second disk being removable for enlarging an inner transverse dimension of said second disk beyond that of the first bore;
   said third transverse dimension being within an ISO H7 standard tolerance.

5. The apparatus of claim 4, wherein said disk and said second disk both have outer transverse dimensions greater than or equal to that of a clamping flange used to secure the blade to an arbor.

6. The apparatus of claim 4, wherein at least one of the first, second, and third bores are polygonal.

7. The apparatus of claim 4, wherein said disk and said second disk are both secured to said blade using a fastening means selected from the group consisting of welds, brazes, mechanical fasteners, and adhesives.

8. The apparatus of claim 4, wherein said disks are fabricated from metal.

9. The apparatus of claim 4, wherein at least one of the first, second, and third bores are substantially circular.

10. An apparatus comprising:
    a saw blade; and
    disk means secured to a face of the saw blade, the saw blade having first bore means of a first transverse dimension configured for concentric engagement with a first size arbor, to substantially maintain concentricity of the first bore with the first size arbor during operational rotation about its central axis;
    the disk means having a second bore means of a second transverse dimension configured for concentric engagement with a second size arbor, to substantially maintain concentricity of the second bore with the second size arbor during operational rotation about its central axis;
    the second bore means configured for concentric disposition with the first bore means;
    the second bore means being disposed within a bore removal means portion of said disk means;
    said bore removal means being removable for enlarging an inner transverse dimension of said disk beyond that of the first bore means;
    the first and second transverse dimensions being within an ISO H7 standard tolerance;
    wherein said disk means is configured for selectively mounting the second bore on the second size arbor, and alternatively for removal of said bore removal means to mount the first bore on the first size arbor.

* * * * *

UNITED STATES PATENT AND TRADEMARK OFFICE
CERTIFICATE OF CORRECTION

| | | |
|---|---|---|
| PATENT NO. | : 7,444,914 B2 | Page 1 of 1 |
| APPLICATION NO. | : 11/137665 | |
| DATED | : November 4, 2008 | |
| INVENTOR(S) | : Kurt Brach | |

It is certified that error appears in the above-identified patent and that said Letters Patent is hereby corrected as shown below:

On the title page item (56), "References Cited", under "FOREIGN PATENT DOCUMENTS", at line 16, delete "DE AT 006 785 U2" and insert --AT 006 785 U2--.

Signed and Sealed this

Fifteenth Day of December, 2009

David J. Kappos
*Director of the United States Patent and Trademark Office*